United States Patent
Ohtani et al.

(10) Patent No.: US 6,808,810 B2
(45) Date of Patent: Oct. 26, 2004

(54) RESIN COMPOSITION, LAMINATE AND PRODUCTION OF LAMINATE

(75) Inventors: Kohsuke Ohtani, Sodegaura (JP); Hikaru Shimizu, Ichihara (JP)

(73) Assignee: Sumitomo Chemical Company, Limited, Osaka (JP)

(*) Notice: Subject to any disclaimer, the term of this patent is extended or adjusted under 35 U.S.C. 154(b) by 223 days.

(21) Appl. No.: 10/021,351

(22) Filed: Dec. 19, 2001

(65) Prior Publication Data

US 2002/0132124 A1 Sep. 19, 2002

(30) Foreign Application Priority Data

Dec. 20, 2000 (JP) ........................................ 2000-386781
Feb. 22, 2001 (JP) ........................................ 2001-046383

(51) Int. Cl.$^7$ ................................................. C08F 8/00
(52) U.S. Cl. ................... 428/423.1; 525/132; 525/133; 525/134; 525/396; 525/143; 525/109; 523/396; 428/319.7
(58) Field of Search ............................ 428/423.1, 319.7; 525/396, 132–134, 143, 109; 523/396

(56) References Cited

U.S. PATENT DOCUMENTS

| | | | | |
|---|---|---|---|---|
| 3,758,634 A | * | 9/1973 | Labana et al. | |
| 4,073,775 A | * | 2/1978 | Matsuo et al. | |
| 4,157,428 A | * | 6/1979 | Hammer | 525/117 |
| 4,378,450 A | * | 3/1983 | Ema et al. | |

FOREIGN PATENT DOCUMENTS

| | | |
|---|---|---|
| JP | 06-65469 A | 3/1994 |
| JP | 06-246858 A | 9/1994 |
| JP | 2001-279032 A | 10/2001 |

* cited by examiner

*Primary Examiner*—Rachel Gorr
(74) *Attorney, Agent, or Firm*—Sughrue Mion, PLLC

(57) ABSTRACT

A resin composition comprising 3 to 80 parts by weight of a resol type phenolic resin or 3 to 150 parts by weight of a polyhydric phenol, based on 100 parts by weight of a copolymer (Å) of an epoxy group-containing monomer and an α-olefin, a powder of the resin composition, a laminate having a layer containing the resin composition, and producing method of the laminate.

7 Claims, No Drawings

RESIN COMPOSITION, LAMINATE AND PRODUCTION OF LAMINATE

BACKGROUND OF THE INVENTION

1. Field of the Invention

The present invention relates to a resin composition, a laminate and a method for producing a laminate. More specifically, the present invention relates to a resin composition which can give strong adhesion of an olefin-based and/or styrene-based thermoplastic elastomer and a polyurethane, a laminate obtained by using this resin composition, and a method for producing the laminate.

2. Description of Related Art

As materials having a cushioning property such as interior parts of automobiles, shoe soles, cushioning materials and the like, laminates manufactured by laminating a skin layer and substrate layer on a foamed layer of polyurethane manifesting a cushioning property are used, and conventionally, a vinyl chloride resin and the like are used as the skin layer and the substrate layer. However, from the standpoint of recent environmental problems, materials substituting for a vinyl chloride resin are desired, and as these materials, studies are being developed using an olefin-based or styrene-based thermoplastic elastomer. However, since adhesion between an olefin-based or styrene-based thermoplastic elastomer and a polyurethane is not sufficient, it is necessary to use an adhesive and primer containing an organic solvent for obtaining a strong laminate as disclosed, for example, in JP06-246858A. However, the technology using this adhesive has a problem of deterioration in working environments due to an organic solvent contained in the adhesive, in addition to process complexity owing to an application process of an adhesive.

SUMMARY OF THE INVENTION

An object of the present invention is to provide a resin composition which can give strong adhesion of an olefin-based or styrene-based thermoplastic elastomer and a polyurethane, without using a conventional adhesive and primer containing an organic solvent, further, to provide a laminate obtained by using said resin composition and a method for producing said laminate.

Namely, the present invention relates to a resin composition comprising 3 to 80 parts by weight of a resol type phenol resin(B1) or 3 to 150 parts by weight of a polyhydric phenol(B2), based on 100 parts by weight of a copolymer (Å) of an epoxy group-containing monomer and an olefin.

Further, the present invention relates to a resin composition powder comprising the above-mentioned resin composition and having an average particle size of 30 to 1000 μm.

Furthermore, the present invention relates to a laminate manufactured by laminating a layer (1) made of the above-mentioned resin composition and a layer (2) made of polyurethane or a layer (3) made of an olefin-based and/or styrene-based thermoplastic elastomer.

Still further, the present invention relates to a laminate manufactured by laminating a layer (2) made of polyurethane and a layer (3) made of an olefin-based and/or styrene-based thermoplastic elastomer via a layer (1) made of the above-mentioned resin composition.

Even further, the present invention relates to a method of producing the above-mentioned laminate, comprising producing a layer (1) made of the above-mentioned resin composition by a powder molding method.

The present invention will be described below.

DETAILED DESCRIPTION OF THE INVENTION

The copolymer (Å) of an epoxy group-containing monomer and an olefin used in the present invention is a polymer having repeating units derived from a monomer having an epoxy ring and a carbon-carbon unsaturated bond (a) and repeating units derived from an olefin having 2 to 10 carbon atoms (b). As the monomer having an epoxy ring and a carbon-carbon unsaturated bond, glycidyl acrylate, glycidyl methacrylate, vinyl glycidyl ether, allyl glycidyl ether, methacryl glycidyl ether, glycidyl itaconate and the like are listed, and one or more of them can be used. As the olefin having 2 to 10 carbon atoms, ethylene, propylene, 1-butene and the like are listed, and one or more of them can be used.

The copolymer (Å) may contain a monomer unit (c) other than the repeating units (a) and (b), and examples of a monomer constituting the monomer unit (c) include vinyl carboxylates such as vinyl acetate, vinyl propionate and the like; vinyl ketones such as methyl vinyl ketone, ethyl vinyl ketone and the like; vinyl aromatic compounds such as styrene, α-methylstyrene, vinyltoluene and the like; acrylates such as methyl acrylate, ethyl acrylate, propyl acrylate, n-butyl acrylate, n-octyl acrylate, methyl methacrylate, ethyl methacrylate and the like, and these can be used alone or in combination of two or more.

Examples of the copolymer (Å) of an epoxy group-containing monomer and an olefin are an ethylene-glycidyl acrylate copolymer, ethylene-glycidyl methacrylate-vinyl acetate copolymer, ethylene-glycidyl methacrylate-methyl acrylate copolymer, ethylene-glycidyl methacrylate-ethyl acrylate copolymer, ethylene-glycidyl methacrylate-butyl acrylate copolymer, and among them, an ethylene-glycidyl acrylate copolymer, ethylene-glycidyl methacrylate-vinyl acetate copolymer and ethylene-glycidyl methacrylate-methyl acrylate copolymer are preferable from the standpoint of easy availability.

The contents of the repeating units (a) and (b) in the copolymer (Å) are preferably 5 to 40% by weight and 60 to 95% by weight, respectively. When the content of the repeating unit(a) is less than 5% by weight, an adhesiveness to a polyurethane may become insufficient. On the other hand, When the content of the repeating unit(a) is more than 40% by weight, the storage stability may deteriorate. Herein, the sum of the contents of the repeating units (a) and (b) is 100% by weight.

These can be produced by a known method.

The component (B) to be mixed with the copolymer (Å) in the present invention is a resol type phenolic resin(B1) or polyhydric phenol(B2). As the resol type phenolic resin(B1) is a phenolic resin obtained by reacting phenols and formaldehyde with a basic catalyst. The phenols are a compound having a structure containing a benzene ring, naphthalene ring or other aromatic ring in which at least one OH group is bonded to a carbon atom of the ring, and examples thereof include phenol, hydroquinone, resorcin, catechol, pyrogallol, hydroxyhydroquinone, phloroglucin, α-naphthol and β-naphthol.

Of the resol type phenolic resins, resol type alkylphenolic resins obtained by reacting a phenol containing at least one alkylphenol, and formaldehyde with a basic catalyst are preferable from the standpoint of storage stability. The alkylphenol is a compound having a structure containing a benzene ring in which at least one OH group and alkyl group and/or phenyl group are bonded to carbon atoms of the ring, and examples thereof include methylphenol, octylphenol, nonylphenol, tert-octylphenol, tert-butylphenol, tetramethylbutylphenol, orcine and urushiol. Of them, resol type alkylphenol resins having a softening point measured according to JIS K-7234 (1986) of 50° C. or more are preferable, from the standpoint of simplicity in handling.

The compounding amount of a resol type phenolic resin (B1) is from 3 to 80 parts by weight, preferably from 5 to 70 parts by weight per 100 parts by weight of the copolymer (Å). When the compounding amount of a resol type phenolic resin (B1) is less than 3 parts by weight, adhesion with polyurethane may be insufficient, on the other hand, when the compounding amount of a resol type phenolic resin (B1) is more than 80 parts by weight, the storage stability of a composition may decrease. When an olefin-based polymer (C) described later is used, the compounding amount of a resol type phenol resin(B1) is preferably from 3 to 80 parts by weight, more preferably from 5 to 70 parts by weight based on 100 parts by weight of the total amount of a copolymer (Å), and an olefin-based polymer (C). When the compounding amount of a resol type phenolic resin (B1) is less than 3 parts by weight, adhesion with polyurethane may be insufficient, on the other hand, when the compounding amount of a resol type phenolic resin (B1) is more than 80 parts by weight, the storage stability of a composition may decrease.

The polyhydric phenol (B2) is an aromatic hydroxy compound obtained by substituting two or more hydrogen atoms on an aromatic hydrocarbon nuclei with two or more hydroxyl groups. For example, an aromatic hydroxy compound in which two hydrogen atoms are respectively substituted with a hydroxyl group is a dihydric phenol, and examples of the dihydric phenol include catechol, resorcin, hydroquinone, orcine, urushiol, bisphenol A, binaphthol, anthrahydroquinone and the like. An aromatic hydroxy compound in which three hydrogen atoms are substituted with a hydroxyl group is a trihydric phenol, and examples of the trihydric phenol include pyrogallol, phloroglucin, hydroxyhydroquinone and the like. The polyhydric phenol (B2) is preferably a dihydric phenol from the standpoint of adhesion between a layer made of a resin composition of the present invention and a layer made of a thermoplastic elastomer, in a laminate with the thermoplastic elastomer, and from the standpoint of handling, the polyhydric phenol (B2) is preferably solid at normal temperature.

In the resin composition of the present invention, a polyhydric phenol(B2) is used in an amount of 3 to 150 parts by weight, preferably of 5 to 100 parts by weight per 100 parts by weight of the copolymer(Å). When the amount of a polyhydric phenol(B2) is less than 3 parts by weight, adhesion with polyurethane may be insufficient, on the other hand, when the amount of a polyhydric phenol(B2) is over 150 parts by weight, adhesion between a layer made of a resin composition of the present invention and a layer made of a thermoplastic elastomer may be insufficient, in a laminate with the thermoplastic elastomer.

In the present invention, an olefin-based polymer (C) may also be used in addition to essential components (A) and (B) (B1 or B2). The olefin-based polymer (C) is preferably a polymer containing 50% to 100% by weight or more of a repeating unit derived from an olefin having 2 to 10 carbon atoms and containing no repeating unit derived from a monomer(a) having an epoxy ring and a carbon-carbon unsaturated bond. As the olefin having 2 to 10 carbon atoms, ethylene, propylene, 1-butene, 1-hexene and the like are listed, and these may be used alone or in combination of two or more. The olefin-based polymer (C) may contain also 50% by weight or less of a monomer unit other than the repeating unit derived from an olefin having 2 to 10 carbon atoms (olefin unit), and examples of a monomer constituting the monomer unit other than the olefin unit include vinyl carboxylates such as vinyl acetate, vinyl propionate and the like; vinyl ketones such as methyl vinyl ketone, ethyl vinyl ketone and the like; vinyl aromatic compounds such as styrene, α-methylstyrene, vinyltoluene and the like; acrylates such as methyl acrylate, ethyl acrylate, propyl acrylate, n-butyl acrylate, n-octyl acrylate, methyl methacrylate, ethyl methacrylate, methoxymethyl acrylate, methoxyethyl acrylate and the like, and these can be used alone or in combination of two or more.

When the content of the a repeating unit derived from an olefin having 2 to 10 carbon atoms is less than 50% by weight, the adhesiveness to a layer composed of a thermoplastic elastomer layer described later may decerase.

Examples of the olefin-based polymer (C) include polyethylene, polypropylene, poly-1-butene, ethylene-propylene copolymer, ethylene-1-butene copolymer, ethylene-1-hexene copolymer, ethylene-1-octene copolymer, propylene-1-butene copolymer, propylene-1-hexene copolymer, propylene-1-octene copolymer, ethylene-propylene-1-butene copolymer, ethylene-propylene-1-hexene copolymer, ethylene-propylene-1-octene copolymer, ethylene-vinyl acetate copolymer, ethylene-methyl acrylate copolymer, ethylene-ethyl acrylate and ethylene-methyl methacrylate copolymer, and these are used alone or in combination of two or more. Of them, copolymers of an olefin having 2 to 10 carbon atoms with a vinyl carboxylate and copolymers of an olefin having 2 to 10 carbon atoms with an acrylate are preferable, an ethylene-vinyl acetate copolymer, ethylene-methyl acrylate copolymer, ethylene-ethyl acrylate and ethylene-methyl methacrylate are more preferable, an ethylene-methyl methacrylate copolymer is further preferable, from the standpoint of flexibility and heat resistance. These are produced by a known method.

The compounding amount of an olefin-based polymer (C) is, in the case of use of a resol type phenolic resin(B1), preferably from 1 to 700 parts by weight, more preferably from 5 to 500 parts by weight, further preferably from 10 to 300 parts by weight, based on 100 parts by weight of the copolymer (Å). In the case of use of a polyhydric phenol (B2), the amount of an olefin-based polymer (C) used is preferably from 10 to 1000 parts by weight, further preferably from 50 to 800 parts by weight, based on 100 parts by weight of the copolymer (Å). By compounding of an olefin-based polymer (C), adhesion with an olefin-based or styrene-based thermoplastic elastomer layer can be further improved in some cases. On the other hand, when the amount of an olefin-based polymer (C) is over the above-mentioned range, adhesion with polyurethane may be insufficient.

In the present invention, a carboxylic acid compound (D) may further be added for further improving adhesion with polyurethane. The carboxylic acid compound (D) includes carboxylic acids having 2 to 50 carbon atoms, a metal salts of carboxylic acids derived from the aforesaid carboxylic acids and carboxylic acid amides derived from the aforesaid carboxylic acids. Examples of the carboxylic acid having 2 to 50 carbon atoms include saturated fatty acids such as lauric acid, palmitic acid, stearic acid, arachic acid, behenic acid and the like, unsaturated fatty acids such as oleic acid, erucic acid, ricinolic acid and the like, aromatic carboxylic acids such as benzoic acid and the like, and dicarboxylic acids such as maleic acid and the like. As the metal salt of a carboxylic acid, for example, sodium stearate, potassium stearate and barium stearate are listed. As the carboxylic amide, for example, palmitic amide, stearic amide and behenic amide are listed. These carboxylic acid-based compounds (D) can be used alone or in combination of two or more. Of them, carboxylic acids and carboxylic acid amides are preferable, further, fatty acids and fatty acid amides are preferable, from the standpoint of improvement of adhesion with polyurethane.

The compounding amount of a carboxylic acid-based compound (D) is preferably from 0.1 to 30 parts by weight, more preferably from 0.5 to 20 parts by weight, further preferably from 1 to 10 parts by weight based on 100 parts by weight of the total amount of (A) and (B). By compounding (D), adhesion with polyurethane may be further improved, and the storage stability of a resin composition of the present invention may be improved. On the other hand, when the amount of (D) is over 30 parts by weight, the resulted molded article may show occurrence of poor appearances such as bleed and the like. In the case of use of the above-mentioned olefin-based polymer (C), the compounding amount of a carboxylic acid-based compound (D) is preferably from 0.1 to 30 parts by weight, more preferably from 0.5 to 20 parts by weight, further preferably from 1 to 10 parts by weight based on 100 parts by weight of the total amount of (A), (B) and (C). By compounding (D), adhesion with polyurethane may be further improved, and the storage stability of a resin composition of the present invention may be improved. On the other hand, when the amount of (D) is over 30 parts by weight, the resulted molded article may show occurrence of poor appearances such as bleed and the like.

In the resin composition of the present invention, additives such as an antioxidant, weathering stabilizer, antistatic agent, releasing agent, flame retardant, metal soap, wax, fungus resistant agent, antibacterial agent, filler and the like may be compounded.

For obtaining a resin composition of the present invention, (A) and (B), and optional (C) and/or (D) may be melt-kneaded. The melt-kneading method is not particularly restricted, and there are listed known methods, for example, methods of melt-kneading under heat using a single screw extruder, twin screw extruder, kneader, roll, Banbury mixer and the like.

In production of a layer (1) made of the resin composition of the present invention by a powder slush molding described later, the resin composition is preferably a powder having an average particle size of 30 to 1000 $\mu$m, more preferably 50 to 700 $\mu$m. When the average particle size is less than 30 $\mu$m, the anti-blocking property of the resin composition powder decreases, on the other hand, when the average particle size is over 1000 $\mu$m, the melting property of the resin composition decreases in conducting powder slush molding. Herein, the average particle size is an average particle size at which a cumulative value in a cumulative particle size distribution of the resin composition powder measured according to JIS R 6002 by using standard sieves specified in JIS Z 8801 becomes 50%.

For obtaining a resin composition powder, pellets of a resin composition are obtained by melt-kneading using an extruder. Next, pellets of the resulted resin composition are cooled (preferably, cooled to not more than the glass transition temperature of the resin composition), and a resin composition powder can be obtained using an impact type grinder.

For further improving the anti-blocking property of the resulted resin composition powder, it is preferable to compound a fine powder having an average particle size of 10 $\mu$m or less in an amount of 0.1 to 10 parts by weight based on 100 parts by weight of the resin composition.

As the fine powder having an average particle size of 10 $\mu$m or less, powder pigments, alumina, silica, alumina-silica, calcium carbonate or the like can be used.

The laminate (I) of the present invention is a laminate obtained by laminating a layer (1) made of a resin composition of the present invention and a layer (2) made of polyurethane. The polyurethane has a urethane bond in the molecular chain, and is manufactured by a known method such as a poly-addition reaction of a polyisocyanate with polyhydric alcohol.

From the standpoint of the cushioning property of a laminate, the layer (2) made of polyurethane is preferably a foam. The method of producing a foam is not particularly restricted, and known foaming processing methods, for example, physical foaming methods using a physical foaming agent such as water, carbon dioxide, nitrogen, organic solvent and the like can be used.

The laminate (II) of the present invention is a laminate obtained by laminating a layer (1) made of a resin composition of the present invention and a layer (3) made of an olefin-based and/or styrene-based thermoplastic elastomer, that is, an olefin-based thermoplastic elastomer, styrene-based thermoplastic elastomer or mixture thereof. The olefin-based thermoplastic elastomer is a composition composed of an olefin-based resin and olefin-based rubber, and this composition may be cross-linked by an organic peroxide or the like. This olefin-based resin is a polymer containing 50% by weight or more of a repeating unit derived from one or more olefins having 2 to 10 carbon atoms, and having an A hardness according to JIS K-6301 (1975) of 98 or more, and this olefin-based rubber is a polymer containing 50% by weight or more of a repeating unit derived from one or more olefins having 2 to 10 carbon atoms, and having an A hardness according to JIS K-6301 (1975) of less than 98, and these can be produced by a known method.

Of olefin-based resins used in the olefin-based thermoplastic elastomer, propylene polymers having a content of a repeating unit derived from propylene of 80% by weight or more are preferable from the standpoint of heat resistance. This polymer has a content of a repeating unit derived from propylene of more preferably 85% by weight or more, further preferably 90% by weight or more. Of olefin-based rubbers used in the olefin-based thermoplastic elastomer, ethylene-based polymers having a content of a repeating unit derived from ethylene of 90 to 30% by weight are preferable from the standpoints of flexibility and processability. This polymer has a content of a repeating unit derived from ethylene of more preferably from 85 to 45% by weight, further preferably from 80 to 60% by weight.

The method of preparing a composition of an olefin-based resin and olefin-baser rubber is not particularly restricted, and there can be used known methods, for example, methods of melt-kneading under heat using a single screw extruder, twin screw extruder, kneader, roll, Banbury mixer or the like; methods of blending in an olefin polymerization process, and the like.

The styrene-based thermoplastic elastomer is a polymer containing a repeating unit derived from one or more vinyl aromatic compounds having 8 to 12 carbon atoms such as styrene, p-methylstyrene, α-methylstyrene and the like, and having an A hardness according to JIS K-6301 (1975) of 98 or less. As the styrene-based thermoplastic elastomer, copolymers of vinyl aromatic compounds with conjugated dienes, hydrogenated substances of copolymers of vinyl aromatic compounds with conjugated dienes, copolymers of vinyl aromatic compounds with olefins, and the like are listed, and these copolymers have a structure composed of one block or have a structure composed of different two or more blocks. These copolymers may be used alone or in combination of two or more.

As the thermoplastic elastomer composition used in producing a layer (3) made of an olefin-based and/or styrene-based thermoplastic elastomer by powder slush molding described later, those proposed in U.S. Pat. Nos. 5,308,699 and 5,977,259 are preferably used.

The laminate (III) of the present invention is a laminate manufactured by laminating a layer (2) made of polyurethane and a layer (3) made of an olefin-based and/or styrene-based thermoplastic elastomer via a layer (1) made of a resin composition of the present invention. A core material layer made of a thermoplastic resin may be laminated on the layer (2) made of polyurethane in the laminate, and as this thermoplastic resin, those having an A hardness according to JIS J-6301 (1975) of 100 or more are preferable.

The method of producing a layer (1) made of a resin composition of the present invention, a layer (2) made of polyurethane, and a layer (3) made of an olefin-based and/or styrene-based thermoplastic elastomer is not particularly restricted, and known production methods, for example, a powder molding method, extrusion molding method, compression molding method, calender molding method, injection molding method and vacuum molding method can be used.

The method of producing laminates (I) to (III) is not particularly restricted, and there may be used methods of laminating all layers simultaneously such as a co-extrusion method in which all layers are extruded simultaneously, a method in which molded bodies are set onto an upper mold and a lower mold, then, a melted resin is fed between the set molded bodies and they are molded under press, and other methods. Alternatively, there may be used methods of laminating layers sequentially such as a method in which powder slush molding is conducted on a molded body which has been powder-slush-molded, to obtain a two layer molded body, then, powder slush molding is further conducted on this two layer molded body, a method in which a co-extruded molded body is set on a mold, then, a melted resin is fed onto the surface of this co-extruded molded body and they are molded under press, and other methods.

When a product having a complicated form is molded, and when a layer (1) made of a resin composition of the present invention and a layer (3) made of an olefin-based and/or styrene-based thermoplastic elastomer are molded as a thin skin layer, the method of molding the layer (1) is preferably a powder molding method, and further, the method of molding the layers (1) and (3) is a powder molding method. As this powder molding method, for example, a powder slush molding method, fluidized bed coating method, electrostatic coating method, powder flame spray method and powder rotation molding method are listed.

For example, the method of producing a laminate (II) by a powder slush molding method is conducted by a method composed of the following first process to ninth process.

First step: a step of applying a fluorine and/or silicon-based releasing agent on the molding surface of a mold.

Second step: a step of feeding a powder of a thermoplastic elastomer composition on the molding surface of a mold heated to not less than the melting temperature of the powder of a thermoplastic elastomer.

Third step: a step of heating a powder of a thermoplastic elastomer on the molding surface in the second process for given time, to cause mutual fusion of powders at least surfaces of which are melted.

Fourth step: a step of recovering powders of a thermoplastic elastomer which are not melted, after given time elapsed in the third process.

Fifth step: a step of feeding a powder of a resin composition of the present invention onto the molding surface on which powders of a thermoplastic elastomer are melted.

Sixth step: a step of heating powders of a resin composition of the present invention on the molding surface in the fifth process for given time, to cause mutual fusion of powders at least surfaces of which are melted.

Seventh step: a step of recovering powders of a resin composition of the present invention which are not melted, after given time elapsed in the sixth process.

Eighth step: a step of further heating a mold carrying a melted powder of a thermoplastic elastomer and a powder of a resin composition of the present invention, if necessary.

Ninth step: a step of, after the eighth process, cooling a mold and removing a molded body formed thereon from the mold.

Further, for obtaining a laminate (III) in which a layer made of foamed polyurethane is laminated on a laminate (II) produced by the above-mentioned method, for example, it may be advantageous that a laminate (II) is set on one of a pair of convex and concave molds used for molding a polyurethane layer, raw materials of polyurethane are injected, the molds are closed with pressure, the raw materials are foamed and hardened, to mold a polyurethane foamed layer.

Further, for obtaining a laminate (IV) in which a layer (3) made of an olefin-based and/or styrene-based thermoplastic elastomer, a layer (1) made of a resin composition of the present invention, a layer (2) made of polyurethane and a core material layer made of a thermoplastic resin are laminated, it may be advantageous that a laminate (II) and a core material layer made of a thermoplastic resin molded by injection molding and the like are set respectively on a pair of convex and concave molds used for molding a polyurethane layer, raw materials of polyurethane are injected, the molds are clamped, the raw materials are foamed and hardened, to mold a polyurethane foamed layer.

The laminate of the present invention can be used, for example, in interior parts of automobiles such as an instrumental panel, door trim, console box, pillar and the like, in optimum fashion.

The present invention will be illustrated in detail by Examples below.

EXAMPLE 1

90 parts by weight of an ethylene-glycidyl methacrylate-vinyl acetate copolymer having a content of a glycidyl methacrylate unit of 18% by weight and a content of a vinyl acetate unit of 1% by weight (manufactured by Sumitomo Chemical Co., Ltd., BONDFAST, MFR 340 g/10 min. (JIS K-7210 (1976), load 21.18 N, temperature 190° C.), 10 parts by weight of a resol type alkylphenol resin (manufactured by Showa Kobunshi K.K., CRM-0803) and 0.1 part by weight of an antioxidant (manufactured by Ciba Speciality Chemicals K.K., IRGANOX 1076) were kneaded for 3 minutes under 110° C. and 100 rpm by Laboplasto Mill (manufactured by Toyo Seiki Seisakusho K.K., type 65C150) to produce a resin composition. This resin composition was heated for 5 minutes and compressed for 5 minutes by a press molding machine heated at 200° C. to mold a resin composition sheet having a thickness of 1 mm. The resulted resin composition sheet was set on molds for polyurethane foaming, and raw material liquids of foamed polyurethane (a mixture of polyols mainly composed of propylene oxide and ethylene oxide adducts of glycerine, water, triethanolamine, triethylenediamine and the like, and polymeric MDI) were mixed by a high speed stirring machine for 10 seconds, then, the mixture was fed on the above-mentioned molds for polyurethane foaming, the molds were closed under press, then, the mixture was formed and hardened to produce a laminate. The polyurethane foamed layer had a density of 0.18 g/cc and an average thickness of 10 mm. After left over night and day, the laminate was cut at a width of 25 mm, and the adhesion strength of the resin composition sheet and the polyurethane foamed layer was measured. Measurement of the adhesion strength was effected by peeling the molded sheet from the polyurethane foamed sheet at a rate of 200 mm/min. using a tensile tester. For evaluation of the storage stability of the resin composition, the melt flow rate (hereinafter, described as MFR) directly after kneading by Laboplasto Mill and MFR after storage for 5 days at 50° C. were measured. The measurement of MFR was conducted at a measurement temperature of 130° C. and a load of 21.18 N (2.16 kg) according to JIS K-7210 (1976). The results are shown in Table 1.

EXAMPLE 2

The same procedure as in Example 1 was conducted except that CKM-1634 manufactured by Showa Kobunshi K.K. was used as the resol type alkylphenol resin(B1). The results are shown in Table 1.

EXAMPLE 3

The same procedure as in Example 1 was conducted except use of a resin composition produced by kneading an ethylene-glycidyl methacrylate-vinyl acetate copolymer having a content of a glycidyl methacrylate unit of 18% by weight and a content of a vinyl acetate unit of 1% by weight (manufactured by Sumitomo Chemical Co., Ltd., BOND FAST, MFR 340 g/10 min (JIS K-7210 (1976), load 21.18 N, temperature 190° C.)), 10 parts by weight of a resol type alkylphenol resin (manufactured by Arakawa Kagaku Kogyo K.K., TAMANOL 520S) and 0.1 part by weight of an antioxidant (manufactured by Ciba Speciality Chemicals K.K., IRGANOX 1076) under 130° C. and 100 rpm by Laboplasto Mill (manufactured by Toyo Seiki Seisakusho K.K., type 65C150) for 3 minutes, as the resin composition. The results are shown in Table 1.

EXAMPLE 4

The same procedure as in Example 1 was conducted except use of a resin composition produced by kneading 45 parts by weight of an ethylene-glycidyl methacrylate-vinyl acetate copolymer having a content of a glycidyl methacrylate unit of 18% by weight and a content of a vinyl acetate unit of 1% by weight (manufactured by Sumitomo Chemical Co., Ltd., BOND FAST, MFR 340 g/10 min. (JIS K-7210 (1976), load 21.18 N, temperature 190° C.)), 10 parts by weight of a resol type alkylphenol resin (manufactured by Taoka Kagaku Kogyo K.K., TACKIROL 201), 45 parts by weight of an ethylene-methyl methacrylate copolymer having a content of a methyl methacrylate unit of 20% by weight (manufactured by Sumitomo Chemical Co., Ltd., ACRYFT WH501, MFR 70 g/10 min (JIS K-7210 (1976), load 21.18 N, temperature 190° C.)), 3 parts by weight of palmitic acid and 0.1 part by weight of an antioxidant (manufactured by Ciba Speciality Chemicals K.K., IRGANOX 1076) under 110° C. and 100 rpm by Laboplasto Mill (manufactured by Toyo Seiki Seisakusho K.K., type 65C150) for 3 minutes, as the resin composition. The results are shown in Table 2.

EXAMPLE 5

The same procedure as in Example 1 was conducted except use of a resin composition produced by kneading 45 parts by weight of an ethylene-glycidyl methacrylate-vinyl acetate copolymer having a content of a glycidyl methacrylate unit of 18% by weight and a content of a vinyl acetate unit of 1% by weight (manufactured by Sumitomo Chemical Co., Ltd., BOND FAST, MFR 340 g/10 min (JIS K-7210 (1976), load 21.18 N, temperature 190° C.)), 10 parts by weight of a resol type alkylphenol resin (manufactured by Taoka Kagaku Kogyo K.K., TACKIROL 201), 45 parts by weight of an ethylene-methyl methacrylate copolymer having a content of a methyl methacrylate unit of 20% by weight (manufactured by Sumitomo Chemical Co., Ltd., ACRYFT WH501, MFR 70 g/10 min (JIS K-7210 (1976), load 21.18 N, temperature 190° C.)), 3 parts by weight of palmitic amide (manufactured by Nippon Kasei Chemical Co., Ltd.) and 0.1 part by weight of an antioxidant (manufactured by Ciba Speciality Chemicals K.K., IRGANOX 1076) under 110° C. and 100 rpm by Laboplasto Mill (manufactured by Toyo Seiki Seisakusho K.K., type 65C150) for 3 minutes, as the resin composition. The results are shown in Table 2.

EXAMPLE 6

The same procedure as in Example 1 was conducted except use of a resin composition produced by kneading 45 parts by weight of an ethylene-glycidyl methacrylate-vinyl acetate copolymer having a content of a glycidyl methacrylate unit of 18% by weight and a content of a vinyl acetate unit of 1% by weight (manufactured by Sumitomo Chemical Co., Ltd., BOND FAST, MFR 340 g/10 min (JIS K-7210 (1976), load 21.18 N, temperature 190° C.)), 10 parts by weight of a resol type alkylphenol resin (manufactured by Taoka Kagaku Kogyo K.K., TACKIROL 201), 45 parts by weight of an ethylene-methyl methacrylate copolymer having a content of a methyl methacrylate unit of 20% by weight (manufactured by Sumitomo Chemical Co., Ltd., ACRYFT WH501, MFR 70 g/10 min (JIS K-7210 (1976), load 21.18 N, temperature 190° C.)), and 0.1 part by weight of an antioxidant (manufactured by Ciba Speciality Chemicals K.K., IRGANOX 1076) under 110° C. and 100 rpm by Laboplasto Mill (manufactured by Toyo Seiki Seisakusho K.K., type 65C150) for 3 minutes, as the resin composition. The results are shown in Table 2.

COMPARATIVE EXAMPLE 1

The same procedure as in Example 1 was conducted except use of a resin composition produced by kneading 80 parts by weight of an ethylene-glycidyl methacrylate-vinyl acetate copolymer having a content of a glycidyl methacrylate unit of 18% by weight and a content of a vinyl acetate unit of 1% by weight (manufactured by Sumitomo Chemical Co., Ltd., BOND FAST, MFR 340 g/10 min.(JIS K-7210 (1976), load 21.18 N, temperature 190° C.)), 20 parts by weight of a terpene-phenol copolymer (manufactured by Yasuhara Chemical K.K., YP-902), and 0.1 part by weight of an antioxidant (manufactured by Ciba Speciality Chemicals K.K., IRGANOX 1076) under 110° C. and 100 rpm by Laboplasto Mill (manufactured by Toyo Seiki Seisakusho K.K., type 65C150) for 3 minutes, as the resin composition. The results are shown in Table 3.

COMPARATIVE EXAMPLE 2

The same procedure as in Example 1 was conducted except use of a resin composition produced by kneading 90 parts by weight of an ethylene-glycidyl methacrylate-vinyl acetate copolymer having a content of a glycidyl methacrylate unit of 18% by weight and a content of a vinyl acetate unit of 1% by weight (manufactured by Sumitomo Chemical Co., Ltd., BOND FAST, MFR 340 g/10 min (JIS K-7210 (1976), load 21.18 N, temperature 190° C.)), 10 parts by weight of a novolak type phenol resin (manufactured by Sumitomo Durez K.K., SUMILITE RESIN PR-53195), and 0.1 part by weight of an antioxidant (manufactured by Ciba Speciality Chemicals K.K., IRGANOX 1076) under 110° C. and 100 rpm by Laboplasto Mill (manufactured by Toyo Seiki Seisakusho K.K., type 65C150) for 3 minutes, as the resin composition. The results are shown in Table 3.

COMPARATIVE EXAMPLE 3

The same procedure as in Example 1 was conducted except use of an ethylene-glycidyl methacrylate-vinyl acetate copolymer having a content of a glycidyl methacrylate unit of 18% by weight and a content of a vinyl acetate unit of 1% by weight (manufactured by Sumitomo Chemical Co., Ltd., BOND FAST, MFR 340 g/10 min (JIS K-7210 (1976), load 21.18 N, temperature 190° C.)), as the resin composition. The results are shown in Table 3.

EXAMPLE 7

Production of Resin Composition Powder 90 parts by weight of an ethylene-glycidyl methacrylate-vinyl acetate copolymer having a content of a glycidyl methacrylate unit of 18% by weight and a content of a vinyl acetate unit of 1% by weight (manufactured by Sumitomo Chemical Co., Ltd., BOND FAST, MFR 340 g/10 min.(JIS K-7210 (1976), load 21.18 N, temperature 190° C.), 10 parts by weight of a resol type alkylphenol resin (manufactured by Showa Kobunshi K.K., CRM-0803) and 0.1 part by weight of an antioxidant (manufactured by Ciba Speciality Chemicals K.K., IRGANOX 1076) were kneaded at 110° C. by a twin-screw extruder (manufactured by The Japan Steel Works, Ltd., type TEX-30SS-40W-3V) to produce a resin composition which was cut by a pelletizer to give a resin composition pellet. This pellet was cooled to −100° C. using liquid nitrogen, then, ground while keeping cooled condition, to produce a resin composition powder. The average particle size of the resin composition powder was measured by a sieving method using a standard sieve according to JIS Z-8801 (1976) to find it was 183 μm. 100 parts by weight of this resin composition powder, 1 part by weight of silica (manufactured by Degussa, OX-50), and 1 part by weight of aluminasilica (manufactured by Mizusawa Kagaku Kogyo K.K., JC-30) were mixed at room temperature for 2 minutes at 1500 rpm by a super mixer (manufactured by Kawata Seisakusho K.K., 5L Super Mixer) to obtain a resin composition powder containing a fine powder compounded.

Production of Thermoplastic Elastomer Composition Powder 40 parts by weight of a propylene-ethylene copolymer resin (manufactured by Sumitomo Chemical Co., Ltd., PPD200, ethylene unit content 5 wt %, MFR 228 g/10 min (JIS K-7210 (1976), load 21.18 N, temperature 230° C.)), 45 parts by weight of a hydrogenated substance of a butadiene-styrene copolymer (manufactured by JSR K.K., Dynatron 2311P, MFR 10 g/10 min. (JIS K-7210(1976), load 21.18 N (2.16 kg), temperature 230° C.)), 12 parts by weight of an ethylene-propylene copolymer rubber (manufactured by Sumitomo Chemical Co., Ltd., PPD200, Esprene SPO V0141, propylene unit content 27 wt %, MFR 1 g/10 min. (JIS K-7210(1976), load 21.18 N (2.16 kg), temperature 190° C.)), 3 parts of microcrystalline wax (manufactured by Nippon Seiro K.K., HiMic1080), and 0.1 part by weight of an antioxidant (manufactured by Ciba Speciality Chemicals K.K., IRGANOX 1076) were kneaded at 150° C. by a twin-screw extruder to produce a thermoplastic elastomer composition which was cut by a pelletizer to give a thermoplastic elastomer composition pellet. This pellet was cooled to −120° C. using liquid nitrogen, then, ground while keeping cooled condition, to produce a thermoplastic elastomer composition powder. 100 parts by weight of this thermoplastic elastomer composition powder, 1 part by weight of silica (manufactured by Degussa, OX-50), and 2 parts by weight of aluminasilica (manufactured by Mizusawa Kagaku Kogyo K.K., JC-30) were mixed at room temperature for 2 minutes at 1500 rpm to obtain a thermoplastic elastomer composition powder containing a fine powder compounded.

Production of Laminate Composed of Layer of Resin Composition and Layer of Thermoplastic Elastomer, by Powder Slush Molding Method A powder of a thermoplastic elastomer composition was fed on the molding surface of a mold with grained patterns (30 cm square) heated at 260° C., left for 5 seconds, then, unadhered excess powder was dropped off the mold, then, a resin composition powder was fed on the mold surface to which the powder of a thermoplastic elastomer composition had been adhered, and left for 10 seconds, then, a surplus powder was cleared, and the mold was left in an over at 260° C. for 30 seconds. Then, the mold was cooled, and a sheet was removed from the mold, to obtain a laminate composed of a layer of the resin composition and a layer of the thermoplastic elastomer. The average thickness of a molded sheet obtained by a powder slush molding method was 1.3 mm.

Production of Laminate having Polyurethane Foamed Layer

The above-mentioned molded sheet obtained by a powder slush molding method was set on molds for polyurethane foaming so that the layer surface of the resin composition and the polyurethane foamed layer formed a connected layer, raw material liquids of foamed polyurethane (a mixture of polyols mainly composed of propylene oxide and ethylene oxide adducts of glycerine, water, triethanolamine, triethylenediamine and the like, and polymeric MDI) were mixed by a high speed stirring machine for 10 seconds, then, the mixture was fed on the above-mentioned molds for polyurethane foaming, the molds were closed under press, then, the mixture was formed and hardened to produce a laminate containing a layer of the thermoplastic elastomer, a layer of the resin composition and a polyurethane foamed layer laminated sequentially. The polyurethane foamed layer had a density of 0.18 g/cc and an average thickness of 10 mm. After left over night and day, the laminate was cut at a width of 25 mm, and the adhesion strength of the molded sheet and the polyurethane foamed layer was measured. Measurement of the adhesion strength was effected by peeling the molded sheet from the polyurethane foamed layer at a rate of 200 mm/min. using a tensile tester. The results are shown in Table 3.

EXAMPLE 8

Production of Resin Composition Powder 40 parts by weight of an ethylene-glycidyl methacrylate-vinyl acetate copolymer having a content of a glycidyl methacrylate unit of 18% by weight and a content of a vinyl acetate unit of 1% by weight (manufactured by Sumitomo Chemical Co., Ltd., BOND FAST, MFR 340 g/10 min (JIS K-7210 (1976), load 21.18 N (2.16 kg), temperature 190° C.), 20 parts by weight of a resol type alkylphenol resin (manufactured by Showa Kobunshi K.K., CRM-0803), 40 parts by weight of an ethylene-vinyl acetate copolymer (manufactured by Sumitomo Chemical Co., Ltd., Sumitate HC-10) and 0.1 part by weight of an antioxidant (manufactured by Ciba Speciality Chemicals K.K., IRGANOX 1076) were kneaded at 110° C. by a twin-screw extruder (manufactured by The Japan Steel Works, Ltd., type TEX-30SS-40W-3V) to produce a resin composition which was cut by a pelletizer to give a resin composition pellet. This pellet was cooled to −100° C. using liquid nitrogen, then, ground while keeping cooled condition, to produce a resin composition powder. The average particle size of the resin composition powder was measured by a sieving method using a standard sieve according to JIS Z-8801 (1976) to find it was 171 μm. 100 parts by weight of this resin composition powder, 3 parts by weight of silica (manufactured by Degussa, OX-50), and 3 parts by weight of alumina-silica (manufactured by Mizusawa Kagaku Kogyo K.K., JC-30) were mixed at room temperature for 2 minutes at 1500 rpm by a super mixer (manufactured by Kawata Seisakusho K.K., 5L Super Mixer) to obtain a resin composition powder containing a fine powder compounded.

Production of Laminate Containing Molded Sheet and Polyurethane Foamed Layer Laminated by Powder Slush Molding A powder slush molded sheet containing a layer of the thermoplastic elastomer, a layer of the resin composition and a polyurethane foamed layer laminated sequentially was produced in the same manner as in Example 7, and the adhesion strengths of the molded sheet and polyurethane foamed layer were measured. The results are shown in Table 3.

TABLE 1

| | | Example 1 | Example 2 | Example 3 |
|---|---|---|---|---|
| Resin composition | | | | |
| (A) Ethylene-glycidyl methacrylate-vinyl acetate copolymer | parts by weight | 90 | 90 | 90 |
| (B) Shownol CRM-0803 | parts by weight | 10 | | |
| Shownol CKM-1634 | parts by weight | | 10 | |
| Tamanol 520S | parts by weight | | | 10 |
| Antioxidant | parts by weight | 0.1 | 0.1 | 0.1 |
| Physical properties of laminate | | | | |
| Strength of adhesion with polyurethane | g/25 mm width | 290 | 310 | 230 |
| Storage stability | | | | |
| Initial MFR (MFR1) | g/10 minutes | 75.3 | 67.4 | 62.1 |
| MFR after 5 days at 50° C. (MFR2) | g/10 minutes | 66.4 | 62.6 | 55.3 |
| MFR retention [(MFR2/MFR1) × 100%] | % | 88 | 93 | 89 |

TABLE 2

| | | Example 4 | Example 5 | Example 6 |
|---|---|---|---|---|
| Resin composition | | | | |
| (A) Ethylene-glycidyl methacrylate-vinyl acetate copolymer | parts by weight | 45 | 45 | 45 |
| (B) TACKIROL 201 | parts by weight | 10 | 10 | 10 |
| (C) Ethylene-methyl methacrylate copolymer | parts by weight | 45 | 45 | 45 |
| (D) Palmitic acid | parts by weight | 3 | | |
| Palmitic amide | parts by weight | | 3 | |
| Antioxidant | parts by weight | 0.1 | 0.1 | 0.1 |
| Physical properties of laminate | | | | |
| Strength of adhesion with polyurethane | g/25 mm width | 390 | 370 | 175 |
| Storage stability | | | | |
| Initial MFR (MFR1) | g/10 minutes | 41.9 | 43.2 | 33.7 |
| MFR after 5 days at 50° C. (MFR2) | g/10 minutes | 36.4 | 38.7 | 30.7 |
| MFR retention [(MFR2/MFR1) × 100%] | % | 87 | 90 | 91 |

TABLE 3

| | | Comparative Example 1 | Comparative Example 2 | Comparative Example 3 |
|---|---|---|---|---|
| Resin composition | | | | |
| (A) Ethylene-glycidyl methacrylate-vinyl acetate copolymer | parts by weight | 80 | 90 | 100 |
| Terpene-phenol resin | parts by weight | 20 | | |
| Novolak type phenol resin | parts by weight | | 10 | |
| Antioxidant | parts by weight | 0.1 | 0.1 | 0.1 |
| Physical properties of laminate | | | | |
| Strength of adhesion with polyurethane | g/25 mm width | 280 | 50 | 20 |
| Storage stability | | | | |
| Initial MFR (MFR1) | g/10 minutes | 71.6 | 50.4 | 61.6 |
| MFR after 5 days at 50° C. (MFR2) | g/10 minutes | 0 | 4.3 | 57.2 |
| MFR retention [(MFR2/MFR1) × 100%] | % | 0 | 9 | 93 |

TABLE 4

|  |  | Example 7 | Example 8 |
|---|---|---|---|
| Resin composition |  |  |  |
| (A) Ethylene-glycidyl methacrylate-vinyl acetate copolymer | parts by weight | 90 | 40 |
| (B) Shownol CKM-1634 | parts by weight | 10 | 20 |
| (C) Ethylene vinyl acetate copolymer | parts by weight |  | 40 |
| Antioxidant | parts by weight | 0.1 | 0.1 |
| Physical properties of laminate |  |  |  |
| Strength of adhesion with polyurethane | g/25 mm width | 460 | 470 |

EXAMPLE 9

10 parts by weight of an ethylene-glycidyl methacrylate-vinyl acetate copolymer having a content of a glycidyl methacrylate unit of 18% by weight and a content of a vinyl acetate unit of 1% by weight (MFR 340 g/10 min, 190° C.), 10 parts by weight of resorcin (manufactured by Sumitomo Chemical Co., Ltd.), 80 parts by weight of an ethylene-vinyl acetate copolymer (manufactured by Sumitomo Chemical Co., Ltd., Sumitate HC-10) and 0.1 part by weight of an antioxidant (manufactured by Ciba Speciality Chemicals K.K., IRGANOX 1076) were kneaded for 3 minutes under 110° C. and 100 rpm by Laboplasto Mill (manufactured by Toyo Seiki Seisakusho K.K., type 65C150), then, the mixture was compressed under heat for 5 minutes by a press molding machine heated at 200° C. to obtain a molded sheet having a thickness of 1 mm. The resulted molded sheet was set on molds for polyurethane foaming, and raw material liquids of polyurethane (a mixture of polyols mainly composed of propylene oxide and ethylene oxide adducts of glycerine, water, triethanolamine, triethylenediamine and the like, and polymeric MDI) were mixed by a high speed stirring machine for 10 seconds, then, the mixture was fed on the above-mentioned molds for polyurethane foaming, the molds were closed under press, then, the mixture was formed and hardened to obtain a laminate. After left over night and day, the laminate was cut at a width of 25 mm, and the adhesion strength of the molded sheet and the polyurethane foamed layer was measured. The results are shown in Table 5. For evaluation of melt flowability of the resin composition, the melt flow rate (hereinafter, described as MFR) of the resin composition obtained by Laboplasto Mill kneading was measured. The measurement of MFR was effected at a measurement temperature of 130° C., a load of 2.16 kg, under other conditions according to JIS K 7210. The results are shown in Table 5.

EXAMPLE 10

47.5 parts by weight of an ethylene-glycidyl methacrylate-vinyl acetate copolymer having a content of a glycidyl methacrylate unit of 18% by weight and a content of a vinyl acetate unit of 1% by weight (MFR 340 g/10 min, 190° C.), 5 parts by weight of resorcin (manufactured by Sumitomo Chemical Co., Ltd.), 47.5 parts by weight of an ethylene-vinyl acetate copolymer (manufactured by Sumitomo Chemical Co., Ltd., Sumitate HC-10) and 0.1 part by weight of an antioxidant (manufactured by Ciba Speciality Chemicals K.K. IRGANOX 1076) were kneaded for 3 minutes under 110° C. and 100 rpm by Laboplasto Mill (manufactured by Toyo Seiki Seisakusho K.K., type 65C150), then, the mixture was compressed under heat for 5 minutes by a press molding machine heated at 200° C. to obtain a molded sheet having a thickness of 1 mm. And, according to the procedure in Example 9, a laminate was obtained, and the adhesion strengths of the molded sheet and polyurethane foamed layer were conducted. The results are shown in Table 5. For evaluation of melt flowability of the resin composition, MFR was measured in the same manner as in Example 9. The results are shown in Table 5.

EXAMPLE 11

47.5 parts by weight of an ethylene-glycidyl methacrylate-vinyl acetate copolymer having a content of a glycidyl methacrylate unit of 18% by weight and a content of a vinyl acetate unit of 1% by weight (MFR 340 g/10 min, 190° C.), 5 parts by weight of catechol (manufactured by Kanto Kagaku K.K., Guaranteed Reagent), 47.5 parts by weight of an ethylene-vinyl acetate copolymer (manufactured by Sumitomo Chemical Co., Ltd., Sumitate HC-10) and 0.1 part by weight of an antioxidant (manufactured by Ciba Speciality Chemicals K.K., IRGANOX 1076) were kneaded for 3 minutes under 110° C. and 100 rpm by Laboplasto Mill (manufactured by Toyo Seiki Seisakusho K.K., type 65C150), then, the mixture was compressed under heat for 5 minutes by a press molding machine heated at 200° C. to obtain a molded sheet having a thickness of 1 mm. And, according to the procedure in Example 9, a laminate was obtained, and the adhesion strengths of the molded sheet and polyurethane foamed layer were conducted. The results are shown in Table 5. For evaluation of melt flowability of the resin composition, MFR was measured in the same manner as in Example 9. The results are shown in Table 5.

COMPARATIVE EXAMPLE 4

90 parts by weight of an ethylene-vinyl acetate copolymer (manufactured by Sumitomo Chemical Co., Ltd., Sumitate HC-10), 10 parts by weight of resorcin (manufactured by Sumitomo Chemical Co., Ltd.) and 0.1 part by weight of an antioxidant (manufactured by Ciba Speciality Chemicals K.K., IRGANOX 1076) were kneaded for 3 minutes under 110° C. and 100 rpm using Laboplasto Mill (manufactured by Toyo Seiki Seisakusho K.K., type 65C150), then, the mixture was compressed under heat for 5 minutes by a press molding machine heated at 200° C. to obtain a molded sheet having a thickness of 1 mm. And, according to the procedure in Example 9, a laminate was obtained, and the adhesion strengths of the molded sheet and polyurethane foamed layer were conducted. The results are shown in Table 5. For evaluation of melt flowability of the resin composition, MFR was measured in the same manner as in Example 9. The results are shown in Table 5.

TABLE 5

|  | Example 9 | Example 10 | Example 11 | Comparative Example 4 |
|---|---|---|---|---|
| Ethylene-glycidyl methacrylate-vinyl acetate copolymer | 10 | 47.5 | 47.5 |  |
| Ethylene vinyl acetate copolymer | 80 | 47.5 | 47.5 | 90 |
| Resorcin | 10 | 5 |  | 10 |

TABLE 5-continued

|  | Example 9 | Example 10 | Example 11 | Comparative Example 4 |
|---|---|---|---|---|
| Catechol |  |  | 5 |  |
| Strength of adhesion with polyurethane (g/25 mm width) | 310 | 370 | 360 | 20 |
| MFR (g/10 min., 2.16 kg) | 26.6 | 31.0 | 36.2 | 26.3 |

As described above, according to the present invention, an olefin-based and/or styrene-based thermoplastic elastomer and polyurethane can be strongly adhered without using a conventionally primer (adhesive) containing an organic solvent, and a resin composition excellent in powder molding property and storage stability can be provided. Further, a laminate obtained by using this resin composition, and a method of producing this laminate can be provided. Particularly when a polyhydric phenol is used, a resin composition which can give a laminate strongly adhered to polyurethane without using a primer (adhesive), and has good balance between melt flowability required in molding processing and adhesion of a polyurethane formed body, and a laminate obtained by using this resin composition can be provided.

What is claimed is:

1. A resin composition comprising 3 to 150 parts by weight of a polyhydric phenol (B2), based on 100 parts by weight of a copolymer (Å) of an epoxy group-containing monomer and an α-olefin.

2. A powder of the resin composition according to claim 1, having an average particle size of 30 to 1000 μm.

3. A laminate (I) manufactured by laminating a layer (1) made of the resin composition according to claim 1 and a layer (2) made of polyurethane.

4. A laminate (II) manufactured by laminating a layer (1) made of the resin composition according to claim 1 and a layer (3) made of an olefin-based or styrene-based thermoplastic elastomer.

5. A laminate (III) manufactured by laminating a layer (2) made of polyurethane, a layer (3) made of an olefin-based or styrene-based thermoplastic elastomer and a layer (1) made of the resin composition according to claim 1, wherein the layer (1) is located between the layer (2) and the layer (3).

6. The laminate according to claims 3, wherein the layer (1) is a layer produced by a powder molding method.

7. A method for producing the laminate according to claim 3, comprising producing a layer (1) by a powder molding method.

* * * * *